United States Patent
Jang et al.

(10) Patent No.: US 11,952,966 B2
(45) Date of Patent: Apr. 9, 2024

(54) COMPACT SAFETY IGNITION DEVICE FOR DUAL PULSE MOTOR

(71) Applicant: AGENCY FOR DEFENSE DEVELOPEMENT, Daejeon (KR)

(72) Inventors: Seung Gyo Jang, Daejeon (KR); Joo Young Jin, Daejeon (KR)

(73) Assignee: AGENCY FOR DEFENSE DEVELOPEMENT

( * ) Notice: Subject to any disclaimer, the term of this patent is extended or adjusted under 35 U.S.C. 154(b) by 0 days.

(21) Appl. No.: 18/132,257

(22) Filed: Apr. 7, 2023

(65) Prior Publication Data

US 2023/0407818 A1  Dec. 21, 2023

(30) Foreign Application Priority Data

Jun. 17, 2022  (KR) .................. 10-2022-0074034

(51) Int. Cl.
*F02K 9/38* (2006.01)
*F02K 9/95* (2006.01)

(52) U.S. Cl.
CPC .................. *F02K 9/38* (2013.01); *F02K 9/95* (2013.01); *F05D 2260/99* (2013.01)

(58) Field of Classification Search
CPC ..... F02K 9/12; F02K 9/28; F02K 9/38; F02K 9/95
See application file for complete search history.

(56) References Cited

U.S. PATENT DOCUMENTS 4,046,076 A * 9/1977 Hampton ................. F42C 15/31
102/202
5,600,946 A * 2/1997 Dombrowski .......... F02K 9/346
60/253

(Continued)

FOREIGN PATENT DOCUMENTS

JP        2013060915 A    4/2013
KR       20050014016 A    2/2005
(Continued)

OTHER PUBLICATIONS

English Translation of Korean Notice of Allowance Application No. 10-2022-0074034; dated Dec. 9, 2022; pp. 7.

(Continued)

*Primary Examiner* — Alain Chau
(74) *Attorney, Agent, or Firm* — NIXON PEABODY LLP

(57) ABSTRACT

A compact safety ignition device for a dual pulse motor capable of preventing accidental ignition of an ignition device includes a housing which forms an accommodation space and coupled to a front port of a combustion tube. Primary and secondary circuit portions mounted inside the housing for generating ignition signals for a primary and secondary propellant, respectively. A primary ignition device mounted at one end of the housing and electrically connected to the primary circuit portion and accommodated in the combustion tube. A secondary bulkhead initiator mounted inside the housing and electrically connected to the secondary circuit portion. The primary ignition device includes a primary detonation portion electrically connected to the primary ignition device and includes a primary bulkhead initiator electrically connected to the primary detonation portion at a protrusion protruding from an end of the primary detonation portion.

5 Claims, 4 Drawing Sheets

(56) References Cited

U.S. PATENT DOCUMENTS

| | | | |
|---|---|---|---|
| 10,378,482 B2* | 8/2019 | Hwang | F02K 9/95 |
| 2013/0111874 A1* | 5/2013 | Kawadu | F02K 9/08 60/256 |
| 2017/0097213 A1* | 4/2017 | Villarreal | F02K 9/95 |
| 2019/0120175 A1* | 4/2019 | Hwang | F02K 9/38 |
| 2021/0071621 A1* | 3/2021 | Lefcourt | F02K 9/96 |
| 2021/0381468 A1* | 12/2021 | Lefcourt | F02K 9/96 |
| 2022/0170432 A1* | 6/2022 | Koehler | F02K 9/28 |

FOREIGN PATENT DOCUMENTS

| | | | |
|---|---|---|---|
| KR | 101063793 | B1 | 9/2011 |
| KR | 101192203 | B1 | 10/2012 |
| KR | 101494393 | B1 | 2/2015 |
| KR | 101835496 | B1 | 3/2018 |

OTHER PUBLICATIONS

English Translation of the Korean Notice of Allowance Application No. 10-2022-0074034; dated Dec. 9, 2022; pp. 7.
Office Action dated Aug. 26, 2022 Application No. 9-5-2022-064696315; pp. 4.

* cited by examiner

COMPACT SAFETY IGNITION DEVICE FOR DUAL PULSE MOTOR

CROSS-REFERENCE TO RELATED APPLICATIONS

This application claims priority under 35 U.S.C. § 119 to Korean Patent Application No. 10-2022-0074034, filed on Jun. 17, 2022, in the Korean Intellectual Property Office, the disclosure of which is incorporated herein by reference in its entirety.

TECHNICAL FIELD

The following disclosure relates to a safety ignition device applied to a dual pulse motor.

BACKGROUND

A dual pulse motor using a solid propellant is a rocket propulsion engine in which two propellant grains are separated by a thin diaphragm in one combustion tube.

Generally, combustion of a primary pulse propellant, among the two propellants, allows a rocket to fly toward a target. A secondary pulse propellant, which is burned after a certain period of time, further accelerates the rocket.

The dual-pulse motor has excellent space utilization compared to the use of a separate two-stage rocket. In addition, since the dual pulse motor uses a single combustion tube and a nozzle, manufacturing costs may be reduced.

However, in terms of an ignition device for igniting a propellant, the dual-pulse motor has difficulties in terms of space design. This is because igniters for igniting two pulse motors are separately installed in a single ignition device.

In general, the ignition device is assembled in front of a rocket propulsion engine of the separated two-stage rocket. Since the ignition device utilizes empty space (port) formed in front of each combustion tube, there is no difficulty in designing, manufacturing, and assembling.

However, the dual-pulse motor has difficulties in terms of space design. This is because the dual-pulse motor requires that the ignition device for the primary pulse propellant and the secondary pulse propellant be connected to a single housing and installed in an empty space (port) formed in front of the combustion tube.

Also, since the secondary pulse propellant in the dual pulse motor is located in front of the combustion tube and surrounded by a diaphragm to separate the secondary pulse propellant from the primary pulse propellant, it is more difficult to secure installation space.

Therefore, in the related art, an igniter for the secondary pulse propellant is installed inside the housing of the ignition device assembled in a front port of the propulsion engine. It is designed to form a flow path between the ignition device and the secondary pulse propellant to supply combustion gas from the igniter to the secondary pulse propellant.

In particular, when the primary pulse propellant is significantly separated from the front of the dual pulse motor, it may be difficult for energy generated by the igniter, for the primary pulse propellant, to reach the primary pulse propellant.

In addition, after the primary pulse propellant operates, the second pulse propellant burns after the lapse of a certain period of time. Here, an igniter housing for the first pulse propellant is exposed to flow and heat caused by the combustion gas of the second propellant, so there is a risk of rupture. The ruptured igniter housing for the primary pulse propellant may scatter and adversely affect a nozzle heat-resistant material.

In the related art, in order to solve the problem, the igniter housing for the primary pulse propellant is designed with aluminum or an aluminum alloy so that the igniter housing melts during combustion of the primary pulse propellant. However, when the primary pulse propellant and the primary pulse igniter are separated from each other, it may not be easy to melt the igniter housing and it may be difficult to melt the igniter housing uniformly.

In addition, in the related art, the igniter for the primary pulse propellant and an initiator are connected through a flow path. At this time, when a distance between the primary pulse propellant and the front of the dual pulse motor is large, the flow path should be lengthened and it may be difficult to initiate the igniter for the primary pulse propellant through the initiator.

The dual pulse motor has a small space for the ignition device. For dual pulse motors, it is very difficult to apply an ignition safety device for preventing accidental ignition together with a single ignition device.

In the related art, in order to solve this problem, only an initiator was installed in the ignition device of the dual pulse motor and an ignition safety device was installed in a separate space. Also, the ignition safety device and the initiator were connected using an explosive transfer line.

Due to the above problems, in the related art, the ignition safety device was not installed in front of the combustion tube in the dual pulse motor, and only the initiator, which is part of the ignition safety device, was installed. The ignition safety device was installed elsewhere, and the ignition safety device and initiator were connected by an explosive transfer line.

Therefore, it is necessary to design a safety ignition device that may solve the above problems.

RELATED ART DOCUMENT

Patent Document

US Patent Publication No. U.S. Pat. No. 5,675,966 A (1997 Oct. 14)

SUMMARY

An exemplary embodiment of the present invention is directed to providing a compact safety ignition device for a dual pulse motor capable of preventing accidental ignition of an ignition device or a propulsion engine, while efficiently using space, through a compact design in which an ignition safety device, an initiator, and an igniter are connected through one housing.

In one general aspect, a safety ignition device includes: a housing forming an accommodation space therein and coupled to a front port of a combustion tube; a primary circuit portion and a secondary circuit portion mounted inside the housing and generating ignition signals for a primary propellant and a secondary propellant charged in the combustion tube, respectively; a secondary bulkhead initiator mounted inside the housing and electrically connected to the secondary circuit portion; and a primary ignition device mounted on one end of the housing, electrically connected to the primary circuit portion, and accommodated in the combustion tube.

The primary circuit portion and the secondary circuit portion may be provided such that the secondary circuit portion is disposed on an upper side and the primary circuit portion is disposed below, and they are stacked with each other.

The secondary bulkhead initiator may be provided as two secondary bulkhead initiators spaced apart from each other in a circumferential direction.

The primary ignition device may include a primary detonation portion electrically connected to the primary circuit portion therein, and include a primary bulkhead initiator electrically connected to the primary detonation portion at a protrusion protruding from an end.

The primary detonation portion may be provided as two primary detonation portions disposed to face each other.

The primary bulkhead initiator may be provided as two bulkhead initiators disposed side by side at a predetermined interval inside the protrusion.

The housing may have a flange on an outer circumference and is coupled to the front port by the flange.

Other features and aspects will be apparent from the following detailed description, the drawings, and the claims.

DETAILED DESCRIPTION OF EXEMPLARY EMBODIMENTS

Figure 1:
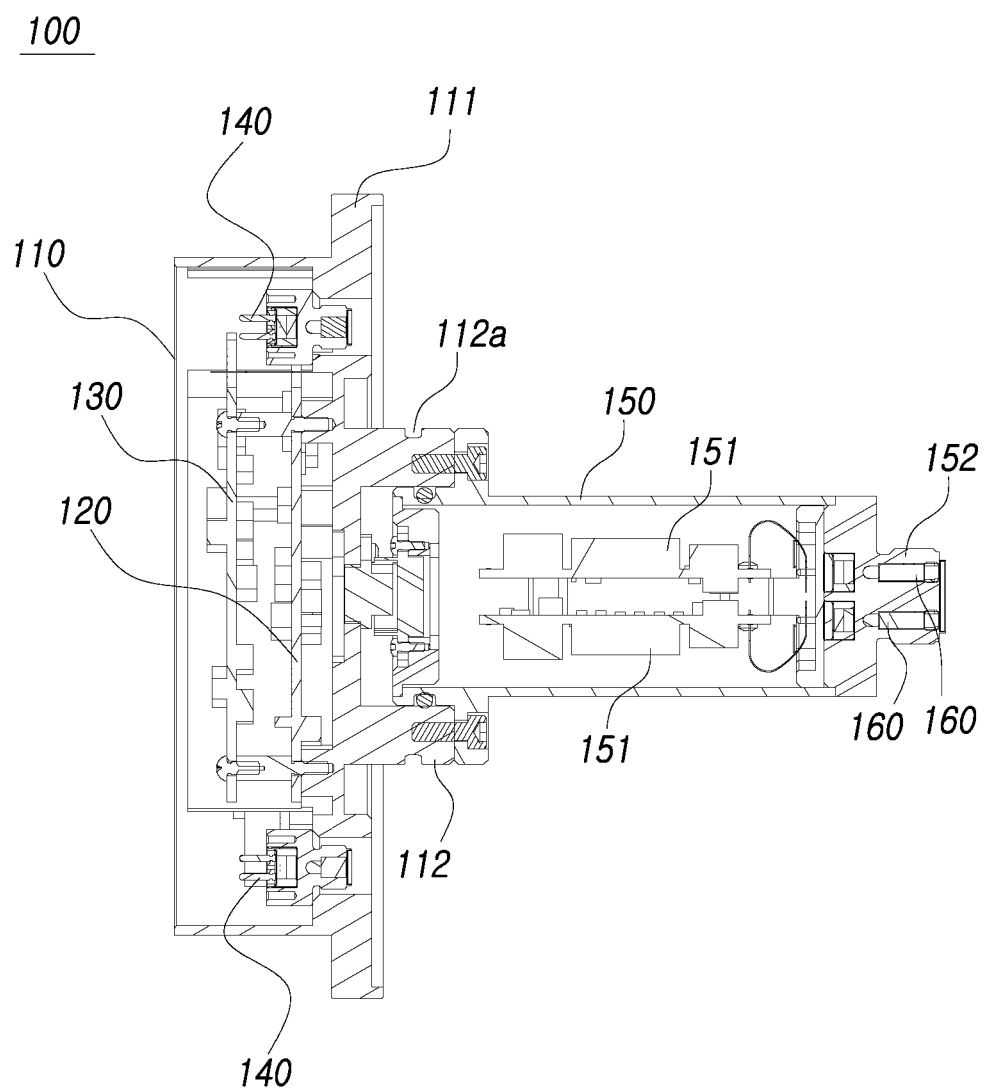
FIG. 1 is an enlarged side cross-sectional view of a safety ignition device according to an exemplary embodiment of the present invention.

In order to fully understand the present invention, exemplary embodiments of the present invention will be described with reference to the accompanying drawings. Exemplary embodiments of the present invention may be modified in various forms, and the scope of the present invention should not be construed as being limited to the examples described in detail below. This exemplary embodiment is provided to more completely explain the present invention to those skilled in the art. Therefore, the shapes of elements in the drawings may be exaggerated to emphasize a clearer description. It should be noted that in each drawing, the same members are sometimes indicated by the same reference numerals. In addition, detailed descriptions of well-known functions and configurations that may unnecessarily obscure the subject matter of the present invention will be omitted.

Hereinafter, exemplary embodiments of the present invention will be described with reference to the accompanying drawings.

Referring to FIG. 1, a safety ignition device 100 according to an exemplary embodiment of the present invention includes a housing 110, a primary circuit portion 120, a secondary circuit portion 130, a secondary bulkhead initiator 140, and a first ignition device 150.

The housing 110 forms an outer appearance of the safety ignition device 100 and has an accommodation space therein. The primary circuit portion 120, the secondary circuit portion 130, the secondary bulkhead initiator 140, and the like may be mounted in the accommodation space.

Figure 3:
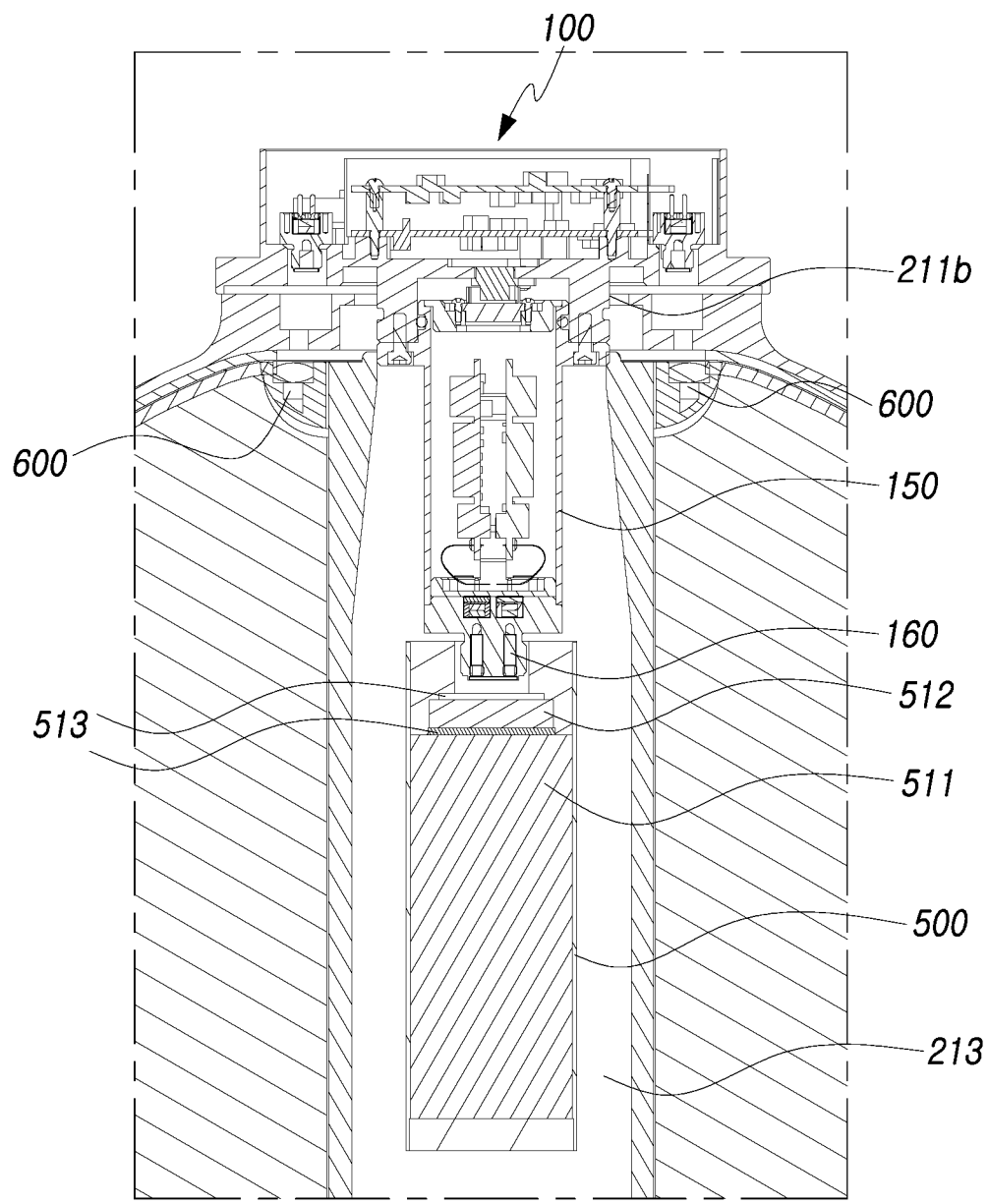
FIG. 3 is a partially enlarged view of FIG. 2.
Figure 4:
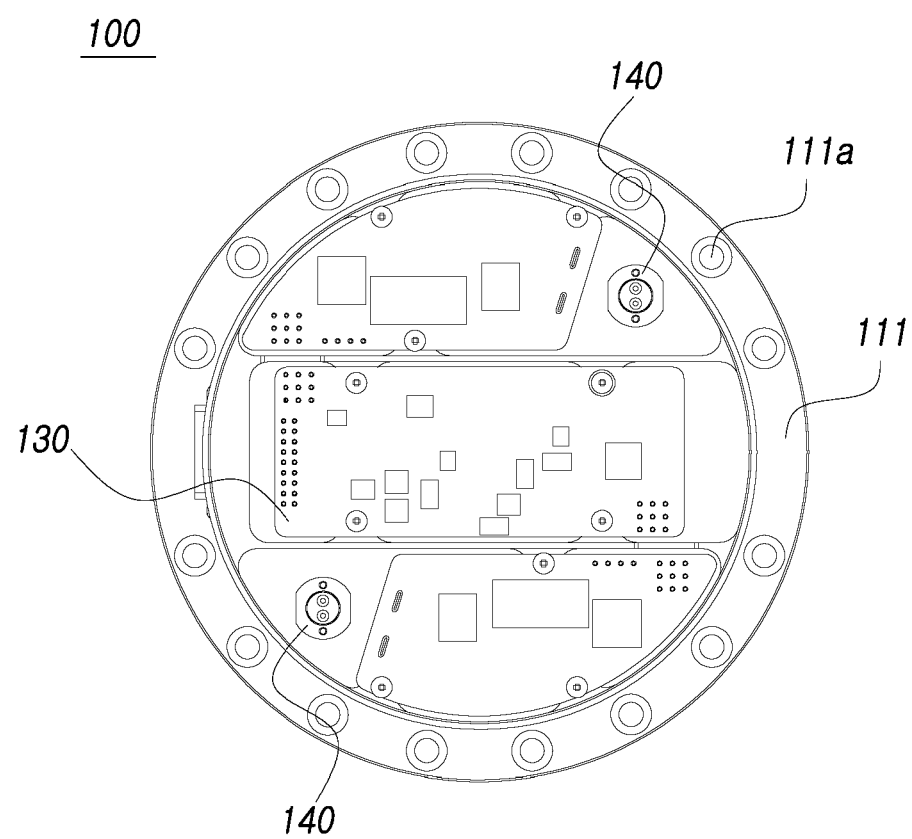
FIG. 4 is a front view of a safety ignition device of FIG. 2.

The housing 110 may be formed in a circular shape when viewed from a plane as shown in FIG. 4, and may be fastened to a front port 211 formed at the front of a combustion tube 210 as shown in FIG. 3.

Inside the accommodation space of the housing 110, the primary circuit portion 120 generating an initiation signal for a primary propellant 300 and a secondary circuit portion 130 generating an initiation signal for a secondary propellant 400 may be installed.

The primary circuit portion 120 and the secondary circuit portion 130 may include a printed circuit board (PCB) configured as electronic circuits.

The primary circuit portion 120 and the secondary circuit portion 130 are co-located in one housing 110 so that the safety ignition device 100 may have increased space efficiency and may be designed to be compact.

Referring to FIG. 1, the primary circuit portion 120 and the secondary circuit portion 130 are stacked and disposed inside the housing 110, and the secondary circuit portion 130 is disposed above and the primary circuit portion 120 may be disposed and mounted below.

A secondary bulkhead initiator 140 may be mounted and provided inside the housing 110 to be electrically connected to the secondary circuit portion 130. As shown in FIG. 4, two secondary bulkhead initiators 140 may be disposed to be spaced apart from each other in a circumferential direction. That is, the two secondary bulkhead initiators 140 may be disposed to be close to an inner circumference of the housing 110 and spaced apart from each other and mounted to be located at circumferential ends.

One end of the housing 110 passes through the front port 211 of the combustion tube 210 and is accommodated inside the combustion tube 210, and the first ignition device 150 electrically connected to the primary circuit portion 120 may be mounted at one end of the housing 110.

The first ignition device 150 receives an ignition signal from the primary circuit portion 120 and ignites the primary propellant 300 charged in the combustion tube 210.

Referring to FIG. 3 as well, the first ignition device 150 has a cylindrical shape and is mounted at one end of the housing 110 of the safety ignition device 100. The first ignition device 150 has a primary detonation portion 151 electrically connected to the primary circuit portion 120 therein.

The primary detonation portion 151 receives the ignition signal from the primary circuit portion 120 and transfers the received ignition signal to the primary bulkhead initiator 160 to be described later. The primary detonation portion 151 may include a PCB-type electronic circuit card, and two primary detonation portions may be arranged to face each other in a longitudinal direction of the primary detonation portion 151.

A protrusion 152 may be formed at an end of the primary ignition device 150, and a primary bulkhead initiator 160 electrically connected to the primary detonation portion 151 may be provided at the protrusion 152.

Two primary bulkhead initiators 160 may be arranged side by side at a predetermined interval inside the protrusion 152.

Two primary detonation portions 151 and two primary bulkhead initiators 160 may be configured and connected to each other in a one-to-one manner. By configuring two primary detonation portions 151 and two primary bulkhead initiators 160, the first propellant 300 may be ignited by transmitting an ignition signal from the other side even if a problem occurs in one side during an ignition process.

Therefore, by configuring the primary circuit portion 120, the primary detonation portion 151, and the primary bulkhead initiator 160 together in a space close to each other, utilization of space may be more efficient and the safety ignition device 100 itself may be designed to be compact. In addition, the reliability of ignition of the first propellant 300 may be increased by configuring two primary detonation portions 151 and two primary bulkhead initiators 160.

Referring to FIG. 4, the housing 110 may have a flange 111 on an outer circumference and be coupled to the front port 211 by the flange 111.

The housing 110 may have the flange 111 with an outer circumference protruding so that the flange 111 may be coupled to the front port 211 by a fastening member, such as a bolt. To this end, a plurality of fastening holes 111a may be formed through the flange 111.

Also, referring to FIG. 3, the front port 211 formed at one end of the combustion tube 210 is connected to the hollow portion 213 inside the combustion tube 210 and has a through-portion 211b allowing the housing 110 to be inserted and coupled therein. Also, one end of the housing 110 may form a protruding insertion portion 112 to be inserted into the through-portion 211b of the front port 211. A recess 112a may be formed around the insertion portion 112 to install an O-ring for sealing the inside of the combustion tube 210.

Figure 2:
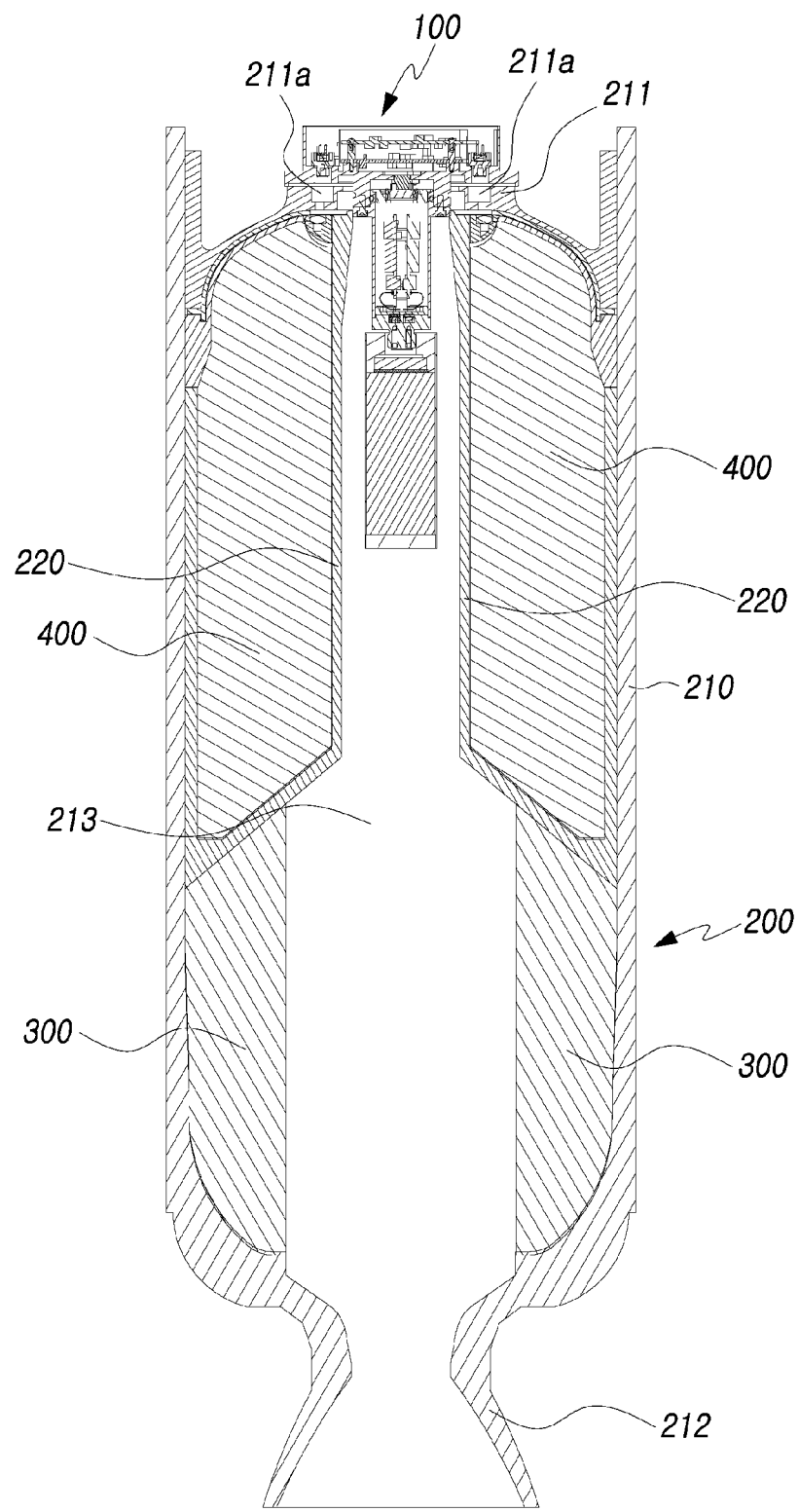
FIG. 2 is a cross-sectional side view of a propulsion engine according to an exemplary embodiment of the present invention.

Referring to FIG. 2 together, the propulsion engine 200 according to an exemplary embodiment of the present invention may include the combustion tube 210, the primary propellant 300, the secondary propellant 400, the diaphragm 220, and the safety ignition device 100 described above.

The combustion tube 210 includes the front port 211 formed at one end and a nozzle 212 formed at the other end. Inside the combustion tube 210, a hollow portion 213 leading to the nozzle 212 is formed. The combustion tube 210 includes the hollow portion 213 through which the inside extends from the front port 211 to the nozzle 212, and one end of the combustion tube 210 is sealed by coupling the safety ignition device 100 to the front port 211.

The primary propellant 300 and the secondary propellant 400 are charged inside the combustion tube 210, and are charged around an inner wall of the combustion tube 210, while surrounding the hollow portion 213. In addition, the primary propellant 300 and the secondary propellant 400 are charged to be distinguished from each other, and are separated from each other by the diaphragm 220.

At the time of ignition, the primary propellant 300 is ignited first, and the secondary propellant 400 is ignited with a time difference. The secondary propellant 400 is surrounded by the diaphragm 400 so that the secondary propellant 400 may withstand heat and pressure generated as the primary propellant 300 burns for a predetermined time, and may be ruptured when ignited.

The secondary propellant 400 is surrounded by an inner wall of the combustion tube 210 and the diaphragm 400 and distinguished from the primary propellant 300.

Since the primary propellant 300 is burned first, the primary propellant 300 is charged in the nozzle 212 side, and the secondary propellant 400 is charged in the front port 211 side.

The safety ignition device 100 is mounted on the front port 211 of the combustion tube 210 and may sequentially ignite the primary propellant 300 and the secondary propellant 400 at a predetermined time interval.

Referring back to FIG. 3, a primary ignition portion 500 accommodating an ignition agent 510 ignited by the primary bulkhead initiator 160 therein may be fastened to the protrusion 152 of the safety ignition device 100.

A male thread is formed on an outer surface of the protrusion 152 and a female thread is formed at one end of the primary ignition portion 500, so that the protrusion 152 and the primary ignition portion 500 may be engaged with each other and fastened.

The primary ignition portion 500 has a cylindrical shape and may be formed of a fiber reinforced plastic (FRP) tube. The ignition agent 510 is contained in the primary ignition portion 500, and the ignition agent 510 may include an auxiliary ignition agent 512 in a direction of the primary bulkhead initiator 160 and a main ignition agent 511 below the auxiliary ignition agent 512.

A disk 513 formed of styrene is attached to one end of the primary ignition portion 500 so that the auxiliary ignition agent 512 may be contained therein. The disk 513 is also provided between the auxiliary ignition agent 512 and the main ignition agent 511 to prevent the two ignition agents from being mixed with each other.

BKNO3 granules may be used as the auxiliary ignition agent 512, and magnesium teflon viton (MTV) granules may be used as the main ignition agent 511.

Unlike general igniter baskets, the igniter tube is designed as a shot-gun type so that ignition flames are made only in a longitudinal direction of the tube and is devised to ignite a separated primary pulse propellant 23 without adversely affecting an adjacent separation diaphragm 25. In addition, the thin tube is designed to be easily melted only when the primary pulse propellant burns without being deformed while the igniter burns. By designing in this manner, the primary pulse igniter tube may completely or almost completely melt before the secondary pulse motor operates, thereby eliminating a risk of rupture.

Referring back to FIG. 3, the front port 211 is provided with a hole 211a formed in a position in contact with the secondary bulkhead initiator 140, and a secondary ignition portion 600 is provided in a position corresponding to the hole 211a inside the diaphragm 220, so that the secondary ignition portion 600 is ignited by the secondary bulkhead initiator 140 through the hole 211a.

The secondary bulkhead initiator 140 for ignition of the secondary propellant 400 is separated from one end portion of the combustion tube 210 and disposed at a circumferential end. The secondary bulkhead initiator 140 is disposed at one end portion of the combustion tube 210 and disposed inside the diaphragm 220.

Two holes 211a are formed in positions corresponding to the secondary bulkhead initiator 140, and two second ignition portions 600 are formed in positions corresponding to the hole 211a.

The secondary ignition portion 600 may be configured and installed to have a donut shape, and the secondary bulkhead initiator 140 may effectively ignite the secondary ignition portion 600. In addition, even if an ignition failure occurs in one secondary bulkhead initiator 140, the secondary ignition portion 600 may be ignited using another secondary bulkhead initiator 140, thereby improving reliability of ignition.

The secondary ignition portion 600 is installed to be in contact with the secondary propellant 400 inside the diaphragm 220. A fixing jig using urethane foam may be used to separate the secondary ignition portion 600 from the secondary propellant 400. The secondary ignition portion 600 may be radially disposed, and BKNO3 gunpowder, which is manufactured in the form of pellets similar to pills may be used.

The hole 211a may accommodate high-temperature and high-pressure gas generated by the secondary bulkhead initiator.

The primary circuit portion 120 normally operates only when a rated loading signal and ignition signal are sequentially applied. A controller of the primary circuit portion 120 determines whether the loading signal is normal, transmits a loading command to a loading portion, and charges a built-in high voltage capacitor. Subsequently, when an ignition signal is applied at a predetermined time interval, the charge charged in the high voltage capacitor is quickly discharged and the connected primary bulkhead initiator 160 operates.

The secondary circuit portion 130 has the same function as that of the primary circuit portion 120. The secondary propellant 400 has to operate after the primary propellant 300 is burned. In order to prevent accidental ignition of the secondary propellant 400, the controller of the secondary circuit portion 130 may monitor the ignition signal transmitted to the primary propellant 300 and use the monitored ignition signal as a loading condition. To this end, a microcontroller unit (MCU) is installed in the controllers of the primary circuit portion 120 and the secondary circuit portion 130, and input/output signals may be controlled using a driving program.

In addition, a rocket capable of adjusting an ignition timing of the primary propellant 300 and the secondary propellant 400 by configuring the propulsion engine 200 equipped with the safety ignition device 100 described above may be proposed.

In the safety ignition device applied to a dual pulse motor, by installing the safety ignition device in front of a combustion tube, accidental ignition of an ignition device or a propulsion engine may be prevented and reliability of ignition may increase, while space is efficiently used.

The exemplary embodiments of the present invention described above are merely exemplary, and those skilled in the art will appreciate that various modifications and equivalent other exemplary embodiments are possible therefrom. Therefore, it will be well understood that the present invention is not limited to the forms mentioned in the detailed description above. Therefore, the true technical protection scope of the present invention should be determined by the technical spirit of the appended claims. It is also to be understood that the present invention includes all modifications, equivalents and alternatives within the spirit and scope of the present invention as defined by the appended claims.

DETAILED DESCRIPTION OF MAIN ELEMENTS

100: safety ignition device
110: housing
111: flange
111*a*: fastening hole
11: insertion portion
112*a*: recess
120: primary circuit portion
130: secondary circuit portion
140: secondary bulkhead initiator
150: primary ignition device
151: primary detonation portion
152: protrusion
160: primary bulkhead initiator
200: propulsion engine
2210: combustion tube
211: front port
211*a*: hole
211*b*: through-portion
212: nozzle
213: hollow portion
220: diaphragm
300: primary propellant
400: secondary propellant
500: primary ignition portion
510: ignition agent
511: main ignition agent
512: auxiliary ignition
513: disk
600: secondary ignition portion

What is claimed is:

1. A safety ignition device comprising:
a housing forming an accommodation space therein and coupled to a front port of a combustion tube;
a primary circuit portion and a secondary circuit portion mounted inside the housing and generating ignition signals for a primary propellant and a secondary propellant charged in the combustion tube, respectively;
a secondary bulkhead initiator mounted inside the housing and electrically connected to the secondary circuit portion; and
a primary ignition device mounted on one end of the housing, electrically connected to the primary circuit portion, and accommodated in the combustion tube,
wherein the primary ignition device includes a primary detonation portion electrically connected to the primary circuit portion, and the primary detonation portion is provided as primary detonation portions disposed to face each other,
wherein the primary ignition device includes a primary bulkhead initiator electrically connected to the primary detonation portion at a protrusion protruding from an end of the primary detonation portion.

2. The safety ignition device of claim 1, wherein the primary circuit portion and the secondary circuit portion are provided such that the secondary circuit portion is disposed above the primary circuit portion in a stacked configuration.

3. The safety ignition device of claim 1, wherein the secondary bulkhead initiator is provided as two secondary bulkhead initiators spaced apart from each other in a circumferential direction.

4. The safety ignition device of claim 1, wherein the primary bulkhead initiator is provided as two bulkhead initiators disposed side by side at a predetermined interval inside the protrusion.

5. The safety ignition device of claim 1, wherein the housing has a flange on an outer circumference and is coupled to the front port by the flange.

\* \* \* \* \*